(12) United States Patent
Hren et al.

(10) Patent No.: US 9,809,944 B2
(45) Date of Patent: Nov. 7, 2017

(54) REEL SYSTEM WITHIN BOOM

(71) Applicant: Harnischfeger Technologies, Inc., Wilmington, DE (US)

(72) Inventors: William J. Hren, Wauwatosa, WI (US); Ethan Pedretti, Holmen, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 366 days.

(21) Appl. No.: 14/316,211

(22) Filed: Jun. 26, 2014

(65) Prior Publication Data

US 2015/0003950 A1    Jan. 1, 2015

Related U.S. Application Data

(60) Provisional application No. 61/840,620, filed on Jun. 28, 2013.

(51) Int. Cl.
| | |
|---|---|
| *E02F 3/30* | (2006.01) |
| *F16L 3/01* | (2006.01) |
| *E21C 27/30* | (2006.01) |
| *E02F 3/46* | (2006.01) |
| *E02F 9/22* | (2006.01) |
| *F16L 39/04* | (2006.01) |
| *E21C 47/00* | (2006.01) |
| *E02F 9/08* | (2006.01) |

(52) U.S. Cl.
CPC ............... *E02F 3/308* (2013.01); *E02F 3/46* (2013.01); *E02F 9/2275* (2013.01); *E21C 27/30* (2013.01); *E21C 47/00* (2013.01); *F16L 3/012* (2013.01); *F16L 39/04* (2013.01); *E02F 9/0858* (2013.01)

(58) Field of Classification Search
CPC ........... E02F 3/308; E02F 3/46; E02F 9/2275; E21C 27/30; F16L 3/012; F16L 39/04
See application file for complete search history.

(56) References Cited

U.S. PATENT DOCUMENTS

| | | | | |
|---|---|---|---|---|
| 1,410,201 | A | * | 3/1922 | Lutz ................... E02F 3/4075 414/692 |
| 1,769,991 | A | * | 7/1930 | Fundom .............. E02F 3/304 212/223 |

(Continued)

FOREIGN PATENT DOCUMENTS

| | | |
|---|---|---|
| CN | 1033860 | 7/1989 |
| CN | 1898015 | 1/2007 |

(Continued)

OTHER PUBLICATIONS

First Office Action from the Chilean Patent Office for the Application No. 001749-2014 dated Mar. 8, 2017 (10 pages, which includes a Statement of Relevance).

(Continued)

*Primary Examiner* — Charles A Fox
*Assistant Examiner* — Charissa Ahmad
(74) *Attorney, Agent, or Firm* — Michael Best & Friedrich LLP (57) ABSTRACT

A mining machine includes a boom having an interior chamber, a saddle block coupled to the boom, a handle slidably coupled to the saddle block, and a reel system disposed at least partially within the chamber.

38 Claims, 11 Drawing Sheets

(56) References Cited

U.S. PATENT DOCUMENTS

| | | | | |
|---|---|---|---|---|
| 3,219,213 A * | 11/1965 | Learmont | ............... | E02F 3/304 414/692 |
| 4,011,699 A * | 3/1977 | Mickelson | ............ | B66C 23/705 212/288 |
| 4,071,205 A * | 1/1978 | Wieschel | ................. | B66D 1/30 242/602.2 |
| 6,168,542 B1 * | 1/2001 | Chang | .................... | E02F 3/304 37/397 |
| 6,434,862 B1 * | 8/2002 | Hren | ....................... | E02F 3/304 37/398 |
| 6,480,773 B1 | 11/2002 | Hilgart | | |
| 8,590,180 B2 * | 11/2013 | Hren | .................... | E02F 3/4075 37/445 |
| 8,943,715 B2 * | 2/2015 | Gross | .................. | E02F 3/4075 37/445 |
| 9,021,725 B2 * | 5/2015 | Stalker | ....................... | E02F 3/46 37/395 |
| 9,150,391 B2 * | 10/2015 | Wurster | .................... | B66D 1/22 |
| 9,217,234 B2 * | 12/2015 | Pusheck | .................. | E02F 3/308 |
| 9,279,229 B2 * | 3/2016 | Doll | .......................... | E02F 3/46 |
| 9,297,140 B2 * | 3/2016 | Hren | .......................... | E02F 9/14 |
| 9,382,685 B2 * | 7/2016 | Maki | ....................... | E21C 47/00 |
| 2005/0150141 A1 * | 7/2005 | Suzik | .................... | B66C 23/66 37/395 |
| 2007/0107269 A1 * | 5/2007 | Hren | .................... | E02F 3/4075 37/398 |
| 2012/0195729 A1 * | 8/2012 | Hren | ......................... | E02F 9/14 414/687 |
| 2012/0195730 A1 * | 8/2012 | Hren | ....................... | E02F 3/304 414/723 |
| 2013/0195594 A1 * | 8/2013 | Knuth | ..................... | E02F 3/304 414/697 |
| 2013/0259621 A1 | 10/2013 | Wurster et al. | | |
| 2013/0280021 A1 * | 10/2013 | Knuth | ................... | E02F 9/2275 414/718 |
| 2014/0086716 A1 * | 3/2014 | Knuth | ....................... | E02F 3/46 414/697 |
| 2014/0099179 A1 * | 4/2014 | Jones | ........................ | E02F 3/46 414/685 |
| 2014/0112749 A1 * | 4/2014 | Doll | ........................... | E02F 3/46 414/685 |
| 2014/0332095 A1 * | 11/2014 | Smit | ....................... | E21F 16/00 137/355.17 |

FOREIGN PATENT DOCUMENTS

| | | |
|---|---|---|
| CN | 103174180 | 6/2013 |
| CN | 204282422 | 4/2015 |
| JP | 2006283352 | 10/2006 |

OTHER PUBLICATIONS

First Office Action from the Australian Intellectual Property Office for Application No. 2014203473 dated Mar. 14, 2017 (4 pages).
First Office Action from the State Intellectual Property Office of China for Application No. 201410404575.X dated Jul. 1, 2017 (20 pages).

* cited by examiner

FIG. 12

REEL SYSTEM WITHIN BOOM

CROSS-REFERENCE TO RELATED APPLICATIONS

This application claims priority to U.S. Provisional Application No. 61/840,620, filed Jun. 28, 2013, the entire contents of which are incorporated herein by reference.

FIELD OF THE INVENTION

The present invention relates to the field of mining machines. Specifically, the present invention relates to a reel system located within the boom of a mining machine, such as a rope shovel.

Industrial mining machines, such as electric rope or power shovels, draglines, etc., are used to execute digging operations to remove material from a bank of a mine. On a conventional rope shovel, a dipper is attached to a handle, and the dipper is supported by a cable, or rope, that passes over a boom sheave. The rope is secured to a bail that is pivotably coupled to the dipper. During a hoist phase, the rope is reeled in by a winch in a base of the machine, lifting the dipper upward through the bank and liberating the material to be dug. The handle is moved slidingly (e.g., telescopingly) along a saddle block to maneuver a position of the dipper. Long, heavy conduits, such as hydraulic conduits, electric conduits, and grease conduits, are directed from a base portion of the shovel to the dipper, and deliver hydraulic fluid, grease, etc. to the dipper or elsewhere on the mining shovel to assist in the mining operation.

Currently on electric shovels with rack and pinion handle crowding or with hydraulic crowding of telescoping handles there is no reliable method used to get grease, hydraulic fluid, electricity, etc. to the dipper.

SUMMARY

In accordance with one construction, a mining machine includes a boom having an interior chamber, and a handle slidably coupled to the boom. The mining shovel includes a reel system at least partially disposed within the chamber.

In accordance with another construction, a mining machine includes a base, a boom coupled to the base and having an interior chamber, a shipper shaft coupled to the boom, a handle coupled to the shipper shaft and driven linearly by the shipper shaft, a dipper coupled to the handle, and a reel system pivotally disposed at least partially within the chamber. The reel system includes a reel, a first drive member coupled to the reel to drive rotation of the reel, a second drive member coupled to the shipper shaft to drive rotation of the first drive member, and a plurality of conduits extending from the base to the reel, and from the reel to the dipper.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited.

DETAILED DESCRIPTION

Figure 1:
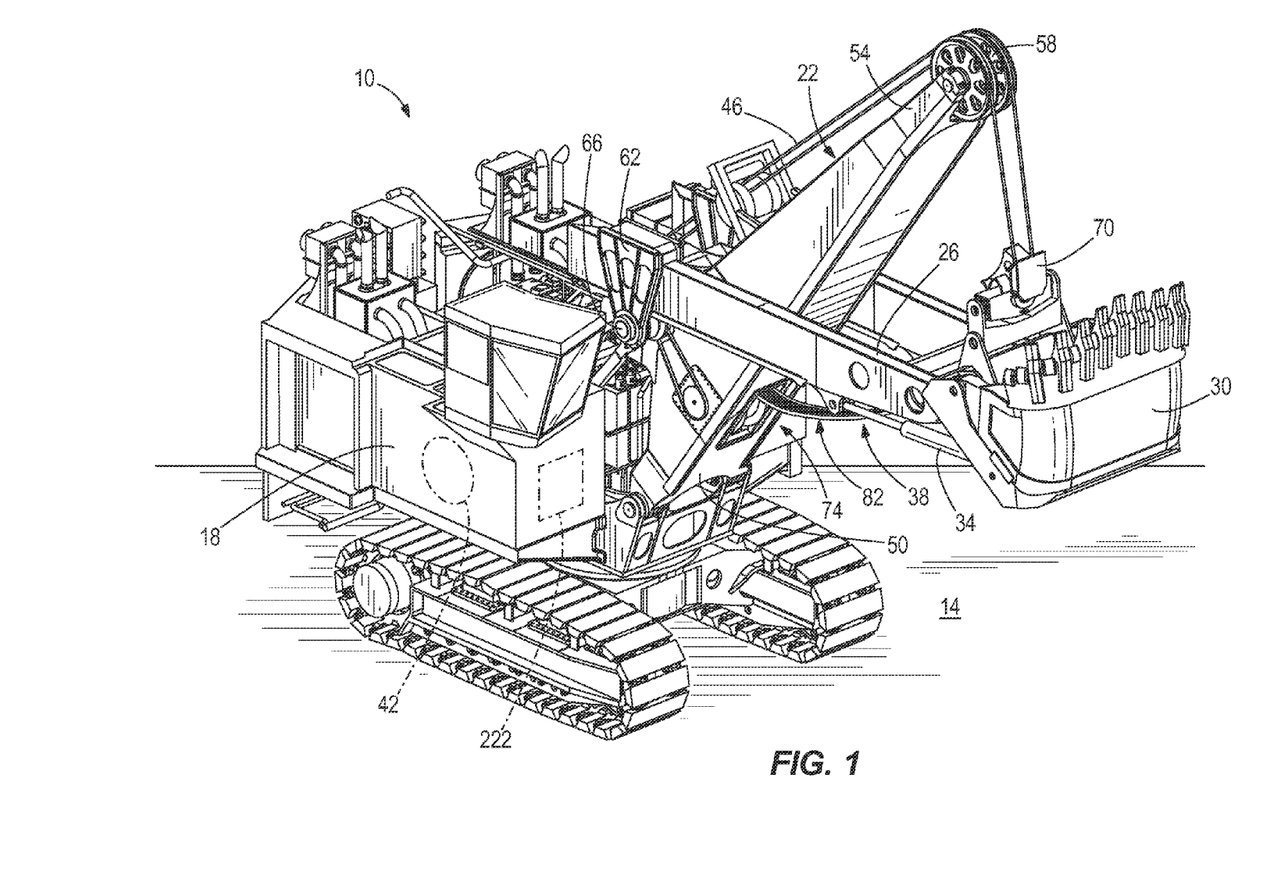
FIG. 1 is a perspective view of a mining shovel.

FIG. 1 illustrates a mining shovel 10. The mining shovel 10 rests on a support surface, or floor 14, and includes a base 18, a boom 22, a handle 26, a dipper 30, tilt actuators 34, and a hydraulic system 38. The base 18 includes a hoist drum 42 (illustrated schematically with dashed lines in FIG. 1) for reeling in and paying out a cable or rope 46. The boom 22 includes a first end 50 coupled to the base 18, a second end 54 opposite the first end 50, a boom sheave 58 coupled to the second end 54, a saddle block 62, and a shipper shaft 66. The boom sheave 58 guides the rope 46 over the second end 54. The saddle block 62 is rotatably coupled to the boom 22 by the shipper shaft 66, which is positioned between the first end 50 and the second end 54 of the boom 22 and extends through the boom 22. The rope 46 is coupled to the dipper 30 by a bail 70, and the dipper 30 is raised or lowered as the rope 46 is reeled in or paid out, respectively, by the hoist drum 42. The handle 26 is coupled to the shipper shaft 66 via a rack and pinion, and slidably (e.g., telescopingly) moves relative to the shipper shaft 66.

As illustrated in FIGS. 2-11, the hydraulic system 38 includes a reel system 74. The reel system 74 is at least partially disposed within a chamber 76 located within the boom 22. The reel system 74 includes a reel 78 for reeling in and reeling out portions of conduits 82. The conduits 82 include, for example, hydraulic conduits, electric conduits, and lubricating grease conduits. In some constructions the conduits 82 are held together next to one another with clips or other binding structures.

Figure 5:
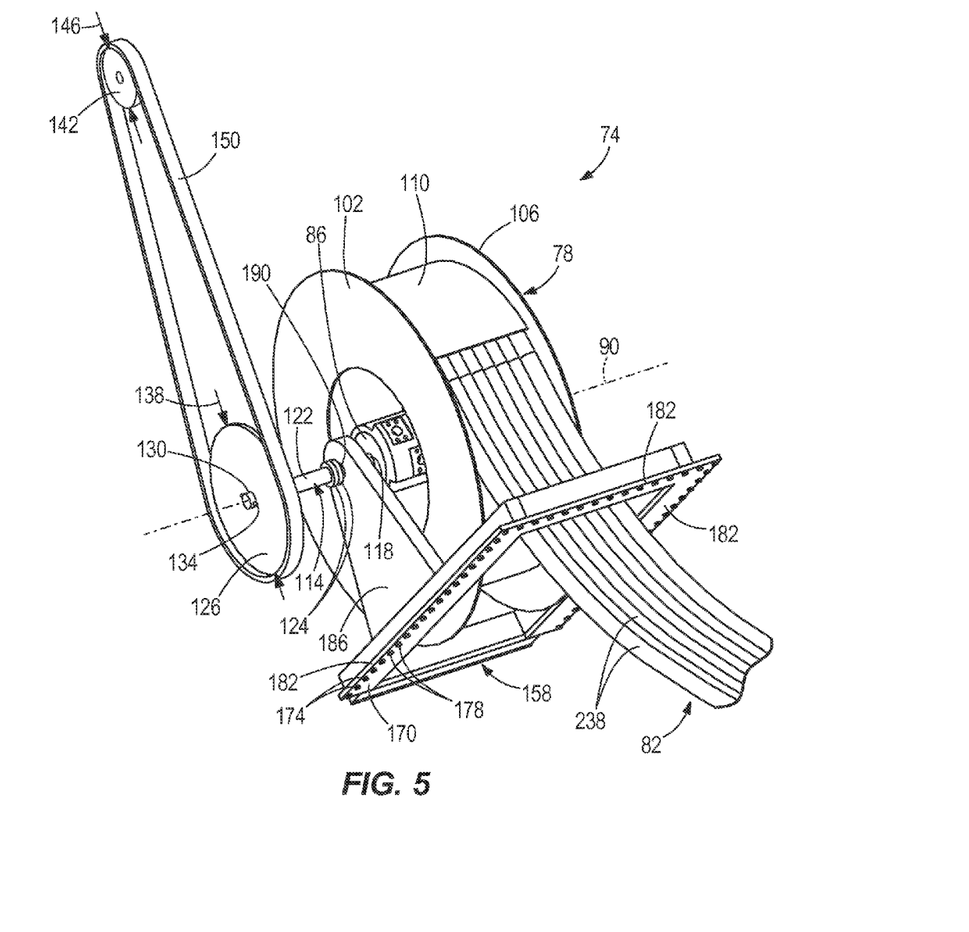
FIG. 5 is a perspective view of the reel system, illustrating a first ratio of drive member diameters.
Figure 5A:
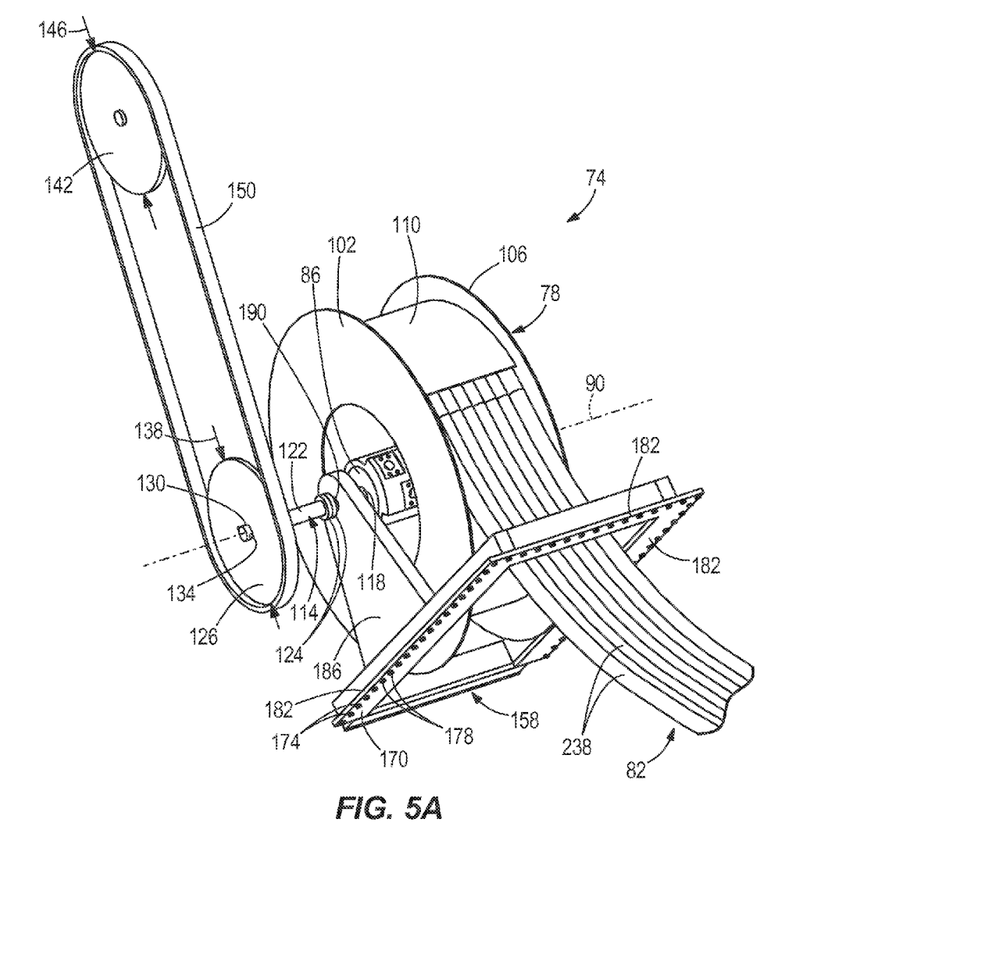
FIG. 5A is a perspective view of the reel system, illustrating a second ratio of drive member diameters.
Figure 6:
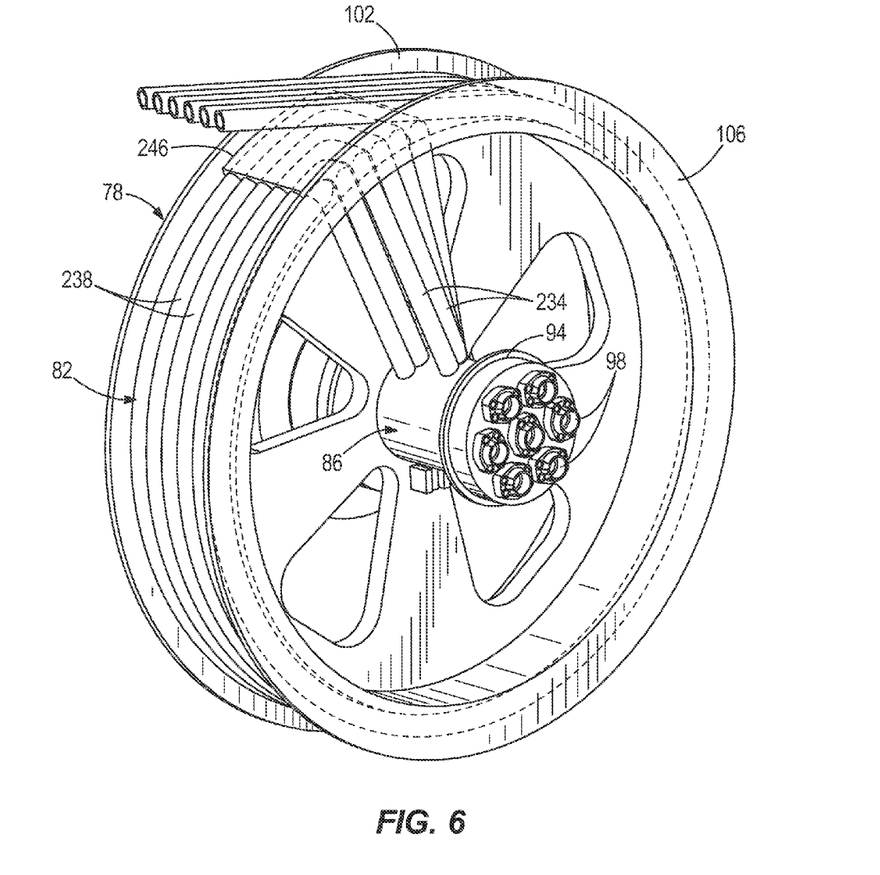
FIG. 6 is a perspective view of the reel, illustrating an interior of the reel.
Figure 7:
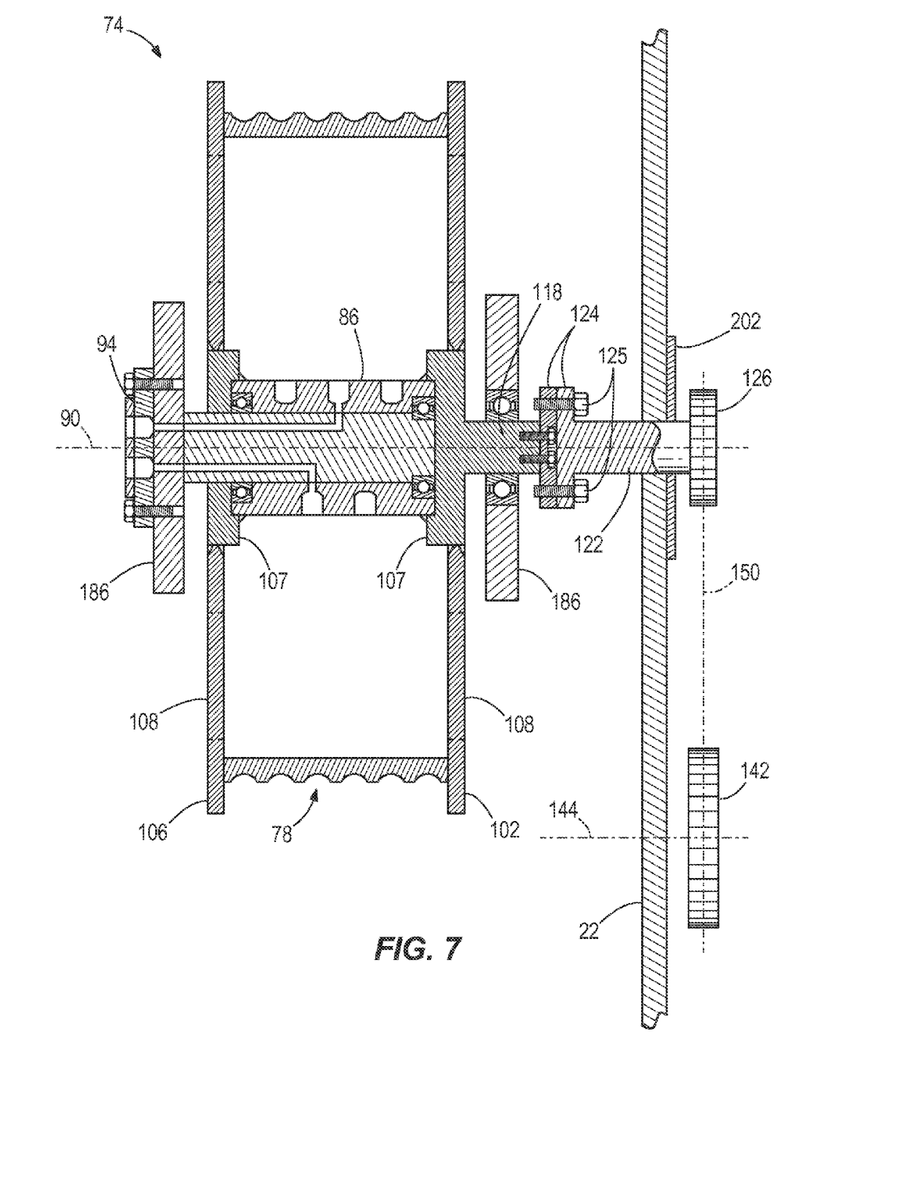
FIG. 7 is a schematic view of the reel system.

As illustrated in FIGS. 5-7, the reel 78 includes a central shaft 86 centered in the reel 78 and defining an axis of rotation 90 (FIGS. 3, 5, 5A, and 7) of the reel 78. The central shaft 86 includes a swivel/rotary union 94 (FIGS. 6, 7, 9, and 10) capable of transporting fluid through rotational motion of the reel 78. The swivel/rotary union 94 includes input ports 98 (FIG. 6) for receiving portions of the conduits 82.

With reference to FIGS. 5 and 7, the reel 78 includes a first member 102 positioned at a first end of the shaft 86 and a second member 106 positioned at a second end of the shaft 86. Each of the members 102, 106 includes an exterior surface and an interior surface facing the interior surface of the opposing member. The reel 78 further includes a reel hub 107 (FIG. 7) connected to the central shaft 86 and webs 108 (FIG. 7) connecting the reel hub 107 to the first and second members 102, 106. The reel 78 also includes a reel cover 110 (FIG. 5). The reel cover 110 extends between the first and second members 102, 106, and protects portions of the conduits 82 from exposure to wear, as well as provides added overall structural stability to the reel 78 and guidance for the conduits 82.

The reel system 74 also includes a drive shaft 114 (FIG. 5) coupled to the reel 78. In some constructions, the drive shaft 114 is releasably coupled to the reel 78. The drive shaft 114 extends from the central shaft 86, along the axis of rotation 90. The drive shaft 114 includes a first drive shaft portion 118 and a second drive shaft portion 122. The first drive shaft portion 118 extends from the central shaft 86, and the second drive shaft portion 122 is releasably coupled to the first drive shaft portion 118. In the illustrated construction, the first and second drive shaft portions 118, 122 include one or more flanges 124 that are bolted together with fasteners 125 (FIG. 7), though in other constructions different connections and/or fastening elements are used. As illustrated in FIG. 7, in some constructions a separate flange 124 is positioned between the first drive shaft portion 118 and the second drive shaft portion 122, and is coupled to the first drive shaft portion 118 (e.g., with fasteners in a countersunk arrangement). Both the first and second drive shaft portions 118, 122 extend along the axis of rotation 90. In some constructions the first and second drive shaft portion 118, 122 are integrally formed together as a single piece.

With continued reference to FIG. 5, the reel system 74 includes a first drive member 126 releasably coupled to the drive shaft 114. In the illustrated construction the drive member 126 is a sprocket having teeth (not shown). In other constructions the drive member 126 is a pulley, sheave, or other structure configured to rotate and drive rotation of the reel 78. The drive member 126 includes a central opening 130. The second drive shaft portion 122 extends into the opening 130. A removable pin 134 extends through a distal end of the second drive shaft portion 122 to prevent the drive member 126 from disengaging the drive shaft 114, though in other constructions different connection mechanisms are used. The drive member 126 has a diameter 138. In some constructions the first drive member 126 is integrally formed with the drive shaft 114. For example, in some constructions the drive member 126 is integrally formed with the second drive shaft portion 122. In other constructions, the drive member 126 and drive shaft portion 122 include a key and/or spline structure, such that rotational motion of the drive member 126 is transferred to the drive shaft portion 122.

Figure 3:
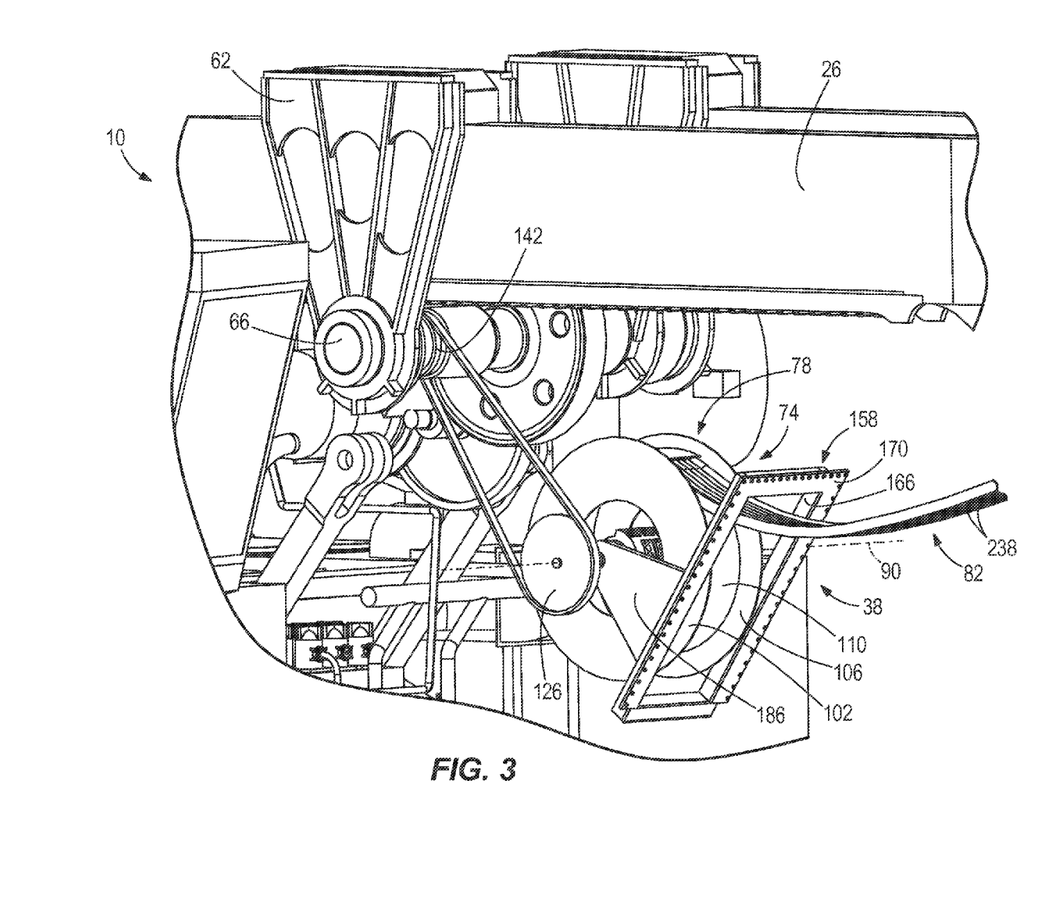
FIGS. 3 and 4 are perspective views of the mining shovel of FIG. 1, with the boom removed, and illustrate the reel system.
Figure 4:
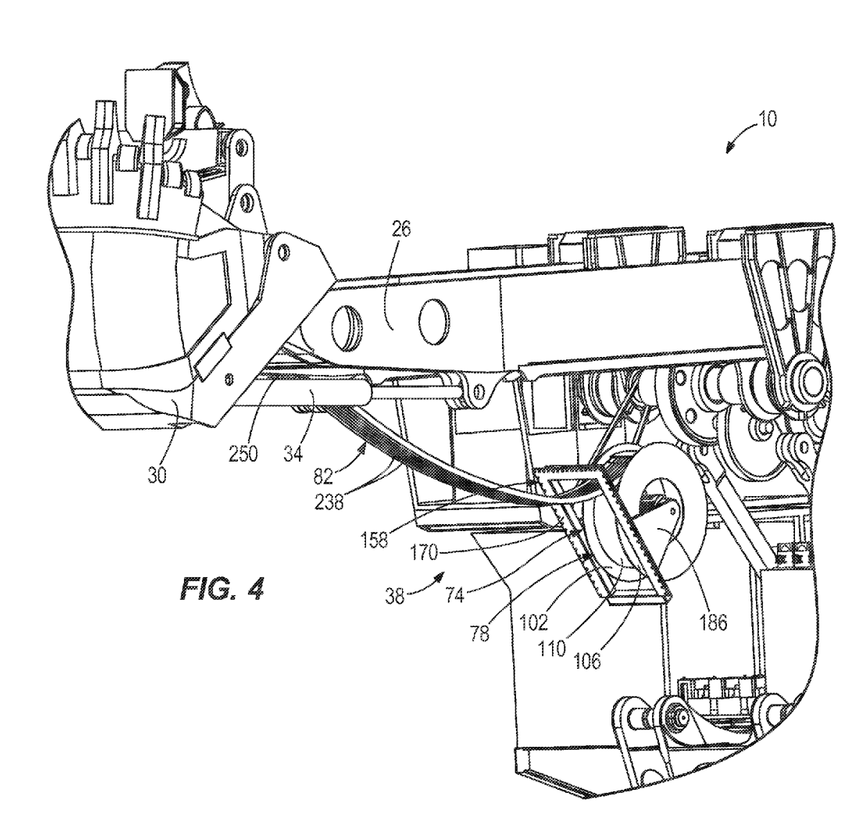

With reference to FIGS. 3, 5, and 7, the reel system 74 also includes a second drive member 142. The drive member 142 is located on the shipper shaft 66 along an axis 144 (FIG. 7). In some constructions the drive member 142 is formed integrally with the shipper shaft 66. In the illustrated construction, the drive member 142 is a sprocket having teeth (not shown). In other constructions the drive member 142 is a pulley, sheave, or other structure configured to rotate and drive rotation of the reel 78. The drive member 142 has a diameter 146 (FIG. 5). The diameter 146 is different than the diameter 138 of the first drive member 126, though in some constructions the diameters 146, 148 are equal.

The reel system 74 also includes a continuous loop element 150 that engages both of the drive members 126, 142. The illustrated loop element 150 is a chain (links not shown). In other constructions the loop element 150 is a rope, belt, or any other structure that transfers the rotational motion of the drive member 142 to the drive member 126 without any significant slippage between the loop element 150 and the drive members 126, 142.

Figure 11:
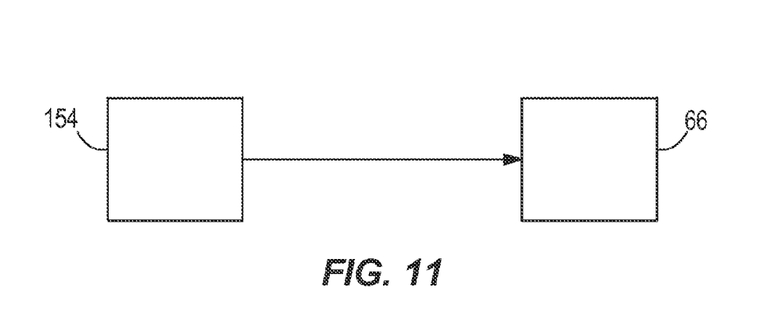
FIG. 11 is a schematic illustration of a prime mover in communication with a shipper shaft of the mining shovel of FIG. 1.

With reference to FIG. 11, the shipper shaft 66 is driven by a prime mover 154. The shipper shaft 66 rotates the drive member 142 and also generates linear movement of the handle 26 at the same time (i.e., generates extension or crowding of the handle 26). Rotation of the drive member 142 causes movement of the loop element 150, which causes rotational movement of the drive member 126 at a rotational speed that is proportional to the drive member 142.

While FIGS. 1-5 illustrate the diameter 138 being larger than the diameter 146, in some constructions, like that shown in FIG. 5A, the diameter 138 is equal to or smaller than the diameter 146. The ratio of the diameter 146 to the diameter 138 is chosen to time the rotation of the shipper shaft 66 with the rotation of the reel 78 such that an optimum sag, or dip (seen for example in FIGS. 1-4) of the conduits 82 is maintained along the conduits 82. Maintaining an optimum sag prevents the conduits 82 from experiencing axial loads (too tight) or bending loads (too loose) that damage the conduits 82, and enhances the overall life of the conduits 82. The optimum sag reduces a total length of the conduits 82 so as to minimize swaying as the mining shovel 10 swings (lateral bending in the conduits 82) while not pulling to a significant degree on the conduits 82 so as to infer axial loads.

In particular, for the construction illustrated in FIG. 5A, the ratio of the diameter 146 to the diameter 138 is between approximately 1.1:1 and 1.9:1. In some constructions, the ratio of the diameter of the diameter 146 to the diameter 138 is between approximately 1.4:1 and 1.6:1. In some constructions, the ratio of the diameter of the diameter 146 to the diameter 138 is approximately 1.5:1. Other constructions include different ranges values for the ratio, such ranges and values depending for example upon the specific handle 26 length and/or boom 22 length being used on the particular mining shovel 10, and the desired amount of sag. In some constructions the ratio between the two diameters 146, 138 is determined based on a diameter of the reel 78 and/or a desired number of wraps of the conduits 82 around the reel 78 (e.g., based off available space inside the interior chamber 76).

With continued reference to FIG. 5A, a ratio above 1:1 is particularly advantageous because this ratio of the diameter 146 to the diameter 138 causes the conduits 82 to be paid out faster than the handle 26 is being lengthened. With this ratio, a sag in the conduits 82 is generated when the handle 26 is at low angles relative to the support surface, or floor 14. When an operator hoists the handle 26 upwards toward the boom sheave 58, (i.e., when the dipper 30 is raised by the rope 46 on the mining shovel 10) the handle 26 moves and rotates in a pivoting manner relative to the boom 22 generally about the shipper shift 66. The sag is then reduced and the conduits 82 straighten out, such that the conduits 82 do not interfere with any components of the mining machine 10.

With reference to FIGS. 1-5A, rotation of the drive member 126 causes rotation of the drive shaft 114, which causes rotation of the reel 78 to reel in or reel out the conduits 82. Thus, as the handle 26 is extended and crowded, the reel system 74 works in harmony with the movement of the handle 26 to reel in or reel out a portion of the conduits 82. The reel system 74 is configured to maintain an optimum level of sag in the conduits 82 that extend generally between the reel 78 and the dipper 30. As the handle 26 is extended, rotation of the shipper shaft 66 causes rotation of the reel 78 to automatically reel out a length of the conduits 82 that maintains a desired overall sag, and as the handle 26 is retracted, the reel 78 automatically reels in a length of the conduits 82 that maintains a desired overall sag. This correlation between the shipper shaft 66 and the reel 78 advantageously reduces or eliminates the need for additional controls or motors for driving the reel 78.

Figure 8:
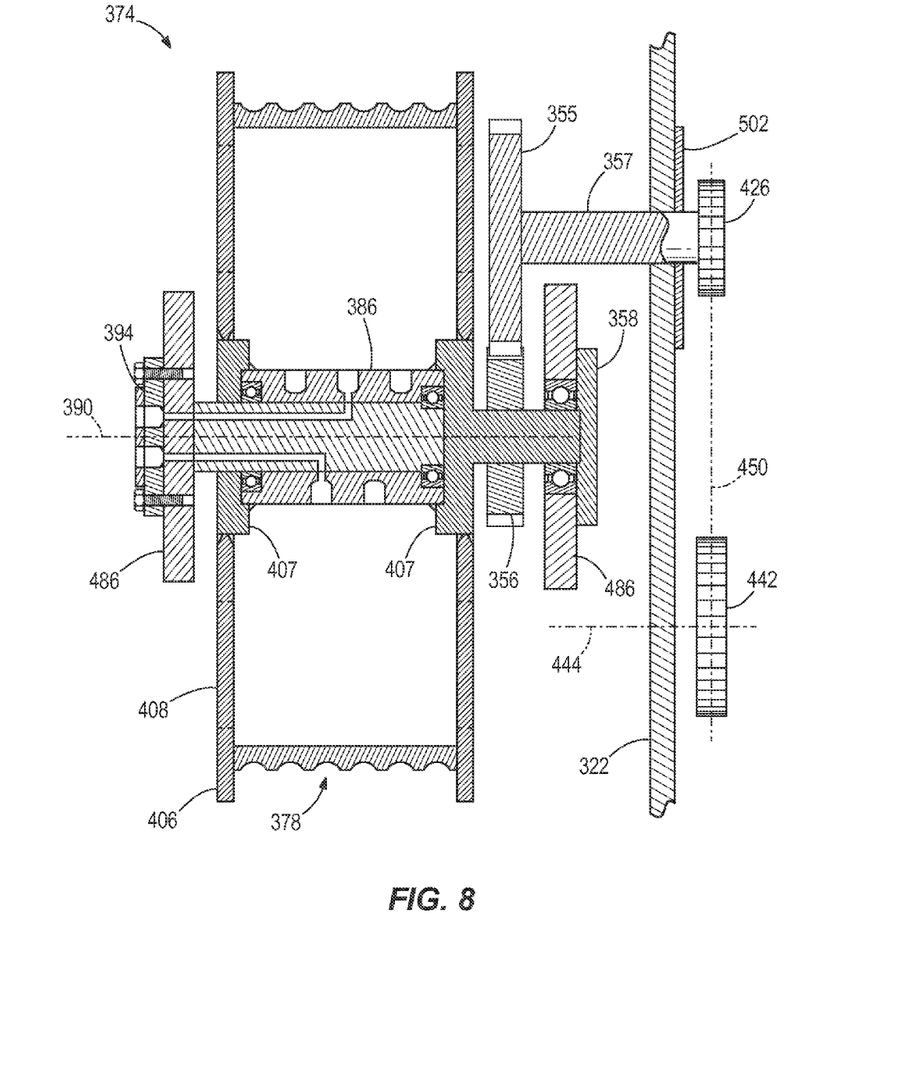
FIG. 8 is a schematic view of another reel system.

With reference to FIG. 8, an alternative reel system 374 is illustrated. The reel system 374 employs much of the same structure and has many of the same properties as the reel system 74, with similar elements increased in numerical value by 300. The reel system 374 is driven by an offset gear mesh that includes drive members 426, 442, along with gears 355 and 356 and a shaft 357. Gear 355, which is on the shaft 357, is coupled to or integrally formed with the drive member 426 and rotates with the drive member 426. Gear 356 is coupled to or integrally formed with a reel 378, and rotates with the reel 378. A loop element 450 couples the two drive members 426 and 442. Rotation of drive member 442 about an axis 444 causes rotation of the reel 378 about an axis 390. Similar to the constructions illustrated in FIGS. 5 and 5A, a ratio between the drive members 442, 426 is chosen to maintain a desired level of sag in the conduits 82. For example, a ratio is chosen such that one full rotation of the drive member 442 causes approximately one and one half full rotations of the reel 378. As illustrated in FIG. 8, the reel system 374 further includes an end cap 358.

Figure 2:
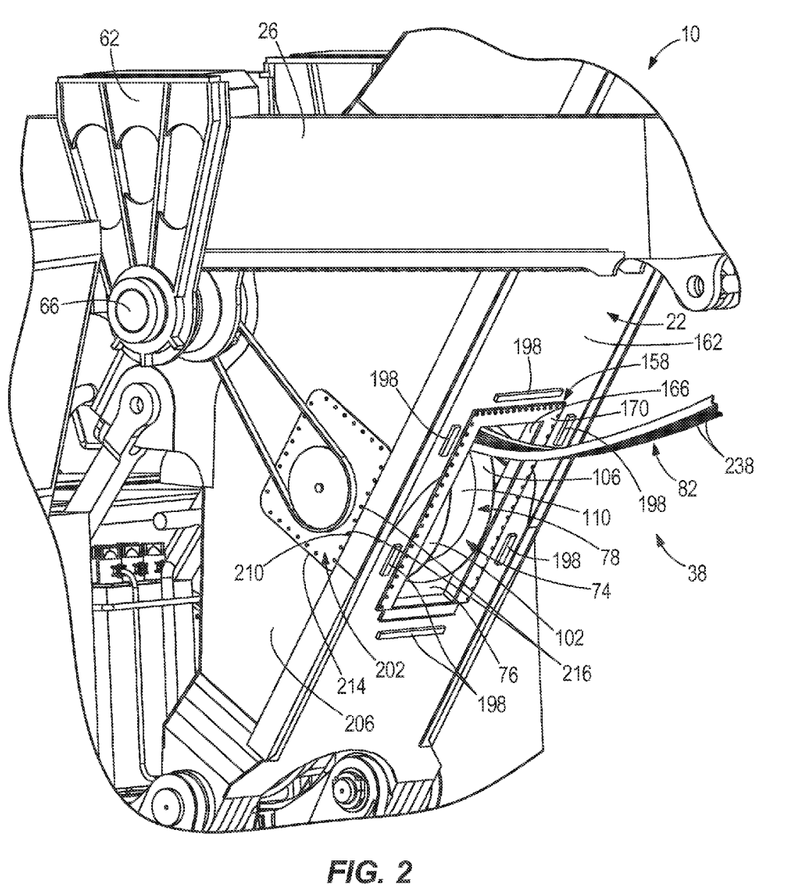
FIG. 2 is an enlarged perspective view of a portion of the mining shovel of FIG. 1, illustrating a reel system located within a chamber inside a boom.

With reference to FIGS. 2-11, the reel system 74 (or similar reel system 374), including reel 78, is accessible for maintenance and/or replacement. In particular, the mining shovel 10 includes a first access element 158 that is coupled to both the boom 22 and to the reel system 74. The access element 158 is located along a bottom facing surface 162 of the boom 22, and has an opening 166 extending through the access element 158 that provides visual access to the reel 78 inside the chamber 76, and that also provides an area for the conduits 82 to pass out of the boom 22. The opening 166 is sized large enough to account for movement and sagging of the conduits 82 during use of the machine 10, without the need for rollers to facilitate movement. In some constructions the access element 158 additionally or alternatively includes one or more rollers (not shown) that facilitate movement of the conduits 82 in and out of the opening 166. As illustrated in FIGS. 2 and 3, the conduits 82 pass over the top of the reel 78, which allows for greater sag. In some constructions the conduits 82 instead pass underneath the reel 78.

The access element 158 includes an outer frame member 170 that defines the opening 166. In the illustrated construction the frame member 170 is rectangular, though in in other constructions the frame member 170 has different shapes. As illustrated in FIG. 5, the frame member 170 includes apertures 174 which are used for insertion of fasteners 178 that releasably couple the frame member 170 to the boom 22. The apertures 174 extend along flanges 182.

The access element 158 includes two projections or arms 186 that extend from the frame member 170 on either side of the reel 78 and couple the first access element 158 to the reel 78. As illustrated in FIG. 5, the projection 186 adjacent the drive member 126 includes an aperture 190. The drive shaft 114 extends through the aperture 190, and is free to rotate within the aperture 190. In some constructions the aperture 190 forms a bearing that includes one or more lubricated surfaces. In some constructions ball bearings are used. The projections 186 fixedly attach the reel 78 to the first access element 158. For example, in some constructions the projection 186 is coupled to the swivel/rotary union 94 with one or more bolts (e.g., on a bolt circle flange).

Figure 9:
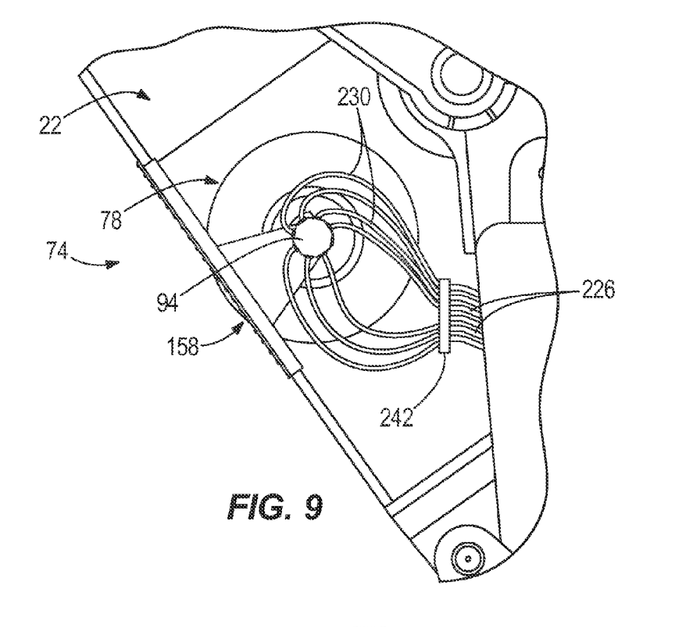
FIGS. 9 and 10 are side plan views of the mining machine, illustrating first and second positions of the reel system.
Figure 10:
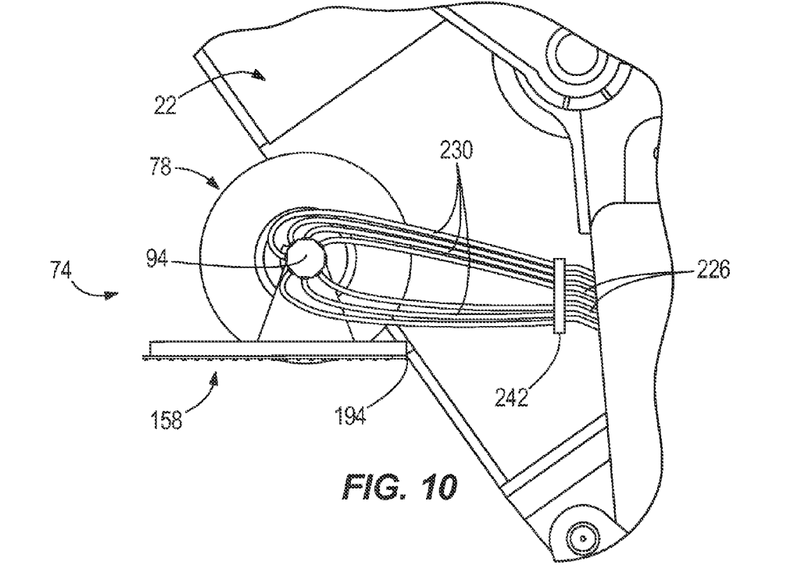

With reference to FIGS. 9 and 10 the access element 158 is pivotable from a first position (FIG. 9) in which the access element 158 is coupled to the boom 22 with the fasteners 178, to a second position (FIG. 10) in which the access element 158 is pivoted away from the boom 22, and the reel 78 is exposed for repair and/or replacement. To permit the pivoting motion, the mining shovel 10 includes one or more pivot elements 194 (e.g., a hinge pin) coupled to both the boom 22 and to the access element 158. The access element 158 is allowed to pivot up to approximately 90 degrees relative to the boom 22, though in other constructions different ranges of movement are permitted. Because of the size and weight of the structures involved, in some constructions a hoist system or additional truck can be used to help lower the access element 158 down to the position illustrated in FIG. 10.

With reference to FIG. 2, in some constructions the boom 22 further includes one or more bumper portions 198. In the illustrated construction the bumper portions 198 extend alongside at least a portion of the access element 158. In other constructions the bumper portions 198 are disposed on the access element 158 itself. In the illustrated construction the bumper portions 198 are elongate members made of metal, rubber, or other suitable material. The bumper portions 198 are separate pieces coupled to the boom 22, although in some constructions the bumper portions 198 are integrally formed in one piece with the boom 22. The bumper portions 198 inhibit the dipper 30 or any other moving part of the machine 10 from contacting and damaging the reel 78. The bumper portions 198 allow a larger diameter reel 78 to be used, and allow at least a portion of the reel 78 to protrude out of the chamber 76, without the reel 78 being contacted or otherwise damaged by a nearby moving component. Using a larger reel 78 is advantageous, since a larger reel 78 requires fewer revolutions to pay out a predefined length of conduits 82, and reduces or eliminates the need to overlay more than one layer of conduits 82 on the reel 78.

Figure 12:
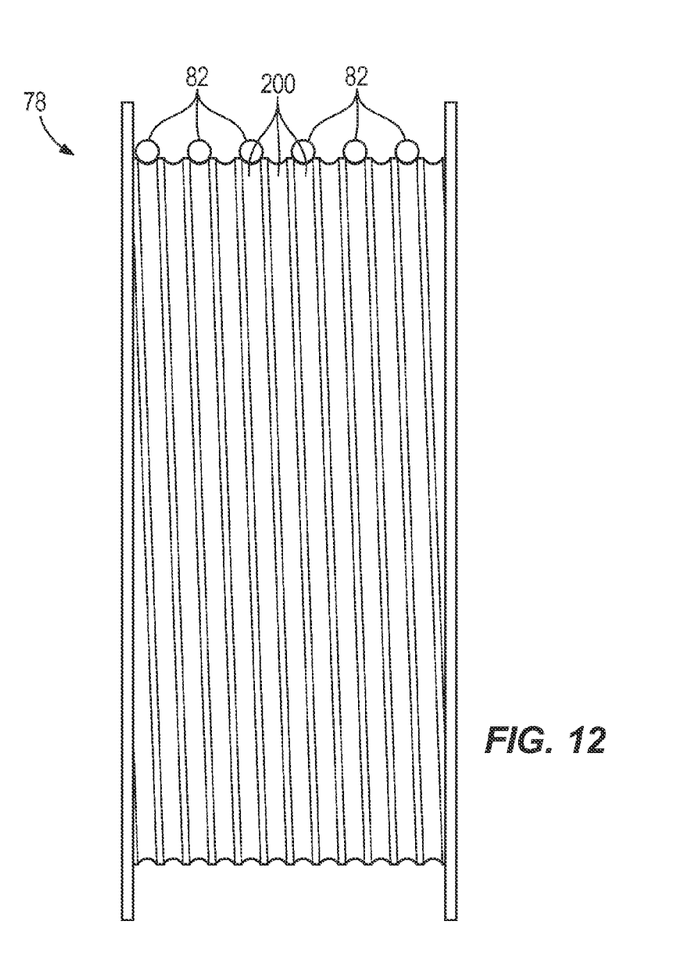
FIG. 12 is a schematic illustration of helical grooving used on the reel system of FIGS. 1-7.

With reference to FIG. 12, in some constructions the reel 78 includes helical grooves 200. The helical grooves 200 also help to reduce or eliminate the need to overlay more than one layer of conduits 82 on the reel 78. For example, in some constructions each conduit 82 (shown partially in cross-section in FIG. 12) is assigned a helical groove 200 that wraps around the reel 78 twice, such that the reel 78 itself completes two rotations before any overlaying or double-layering of conduits 82 becomes necessary, or before any bunching of the conduits 82 occurs on the reel 78.

With reference to FIG. 2, the mining shovel 10 also includes a second access element 202. The access element 202 is coupled to the boom 22 along a side facing surface 206 of the boom 22 and provides access to the chamber 76 and the reel 78. The access element 202 is generally rectangular in shape, though in other constructions different shapes are used. The access element 202 includes apertures 210 along outer edges 214 of the access element 202. The apertures 210 are used for insertion of fasteners 216 that releasably couple the access element 202 to the boom 22.

The access element 202 includes an aperture (not shown) extending through the access element 202 generally in a central area of the access element 202. As illustrated in FIGS. 2 and 3, a portion of the drive shaft 114 extends through the access element 202, and the drive member 126 and a portion of the drive shaft 114 are disposed outside of the chamber 76 and outside of the access element 202.

In order to pivot the reel 78 from the position illustrated in FIG. 9 to the position illustrated in FIG. 10 for repair and/or replacement, the drive member 126 is first removed. To remove the drive member 126, the pin 134 (FIG. 5) is removed from the drive shaft 114, allowing the drive member 126 to slide off the end of the drive shaft 114. In some constructions, and as noted above, the pin 134 maintains a keyed and/or splined connection between the drive member 126 and the drive shaft 114.

Prior to removing the drive member 126, the loop element 150 is first removed from the drive member 126, or from both drive members 126, 142. Alternatively, in some constructions the loop element 150 remains on the drive member 126 as the drive member 126 is removed from the drive shaft 114. With the drive member 126 removed, the fasteners 216 on the access element 202 are loosened. The access element 202 is then slid over the end of the drive shaft 114 and removed from the boom 22, thereby exposing the inside of the chamber 78. The first drive shaft portion 118 is then de-coupled and removed from the second drive shaft portion 122 (i.e., by removing the fasteners extending through the flanges 124 as shown in FIG. 5).

With the drive member 126, access element 202, and the first drive shaft portion 122 removed, the fasteners 178 on the access element 158 are removed, and the access element 158 and reel 78 are free to pivot down to the position illustrated in FIG. 10. To raise the reel 78 back inside the chamber 76 and assemble the reel system 74, the steps described above are reversed in order.

In some constructions, the drive member 126 remains coupled to a portion of the drive shaft 114 and the access element 202 remains on the boom 22. For example, by reaching up into the chamber 76 the first drive shaft portion 118 is de-coupled and removed from the second drive shaft portion 122 (i.e., by removing the fasteners extending through the flanges 124 as shown in FIG. 5). The fasteners 178 on the access element 158 are then removed. The access element 158 and the reel 78 are then free to pivot down, with the access element 202 still remaining on the boom 22, and the second drive shaft portion 122 remaining extending through the access element 202.

Along with the reel system 74 and the conduits 82, the hydraulic system 38 also includes a fluid source 222 (illustrated schematically in dashed lines in FIG. 1). In the illustrated construction, the conduits 82 deliver fluid (e.g., hydraulic fluid) from the fluid source 222 to the tilt actuators 34 near the dipper 30 and to dump cylinders (not shown) in the dipper 30. In other constructions, the conduits 82 deliver fluid to other areas of the mining shovel 10.

With reference to FIGS. 1-11, the conduits 82 include a first set of conduits 226 (FIGS. 9 and 10), a second set of conduits 230 (FIGS. 9 and 10), a third set of conduits 234 (FIG. 6), and a fourth set of conduits 238 (FIGS. 2-6). The hydraulic system 38 includes a first manifold 242 (FIGS. 9 and 10) disposed in the boom 22, the swivel/rotary union 94 (FIG. 6) described above, a second manifold 246 (FIG. 6) disposed within the reel 78, and a third manifold 250 (illustrated schematically in FIG. 4) disposed adjacent the tilt actuators 34. Each of the first manifold 242, the swivel/rotary union 94, the second manifold 246, and the third manifold 250 is in fluid communication with one or more of the conduits 226, 230, 234, 238.

With reference to FIGS. 1, 9 and 10, the conduits 226 extend from the fluid source 222 to the manifold 242. The conduits 226 are rigid, and are made of metal tubing or other rigid material. The conduits 226 are disposed within the mining shovel 10. In some constructions the conduits 226 have some limited amount of flexibility.

With reference to FIGS. 6, 7, 9, and 10, the conduits 230 extend from the manifold 242 to the swivel/rotary union 94. The conduits 230 are flexible, and accommodate the pivoting motion of the reel 78 described above. In particular, and with reference to FIGS. 9 and 10, the conduits 230 are flexible enough, and long enough, to accommodate movement of the reel 78 through approximately up to 90 degrees relative to the boom 22 from the first position (FIG. 9) to the second position (FIG. 10). The manifold 242 remains rigidly attached within the boom 22 while the conduits 230 flex and bend to accommodate the two positions of the reel 78.

With continued reference to FIG. 6, the conduits 234 extend from the swivel/rotary union 94 to the manifold 246. The illustrated conduits 234 are flexible. In some constructions the conduits 234 are rigid, and are made of metal tubing or other rigid material.

With reference to FIGS. 2-6, the conduits 238 extend from the manifold 246 to the manifold 250, and are flexible. At least a portion of the conduits 238 wrap around the reel 78 as the reel 78 is turned by the drive member 126. As illustrated in FIGS. 1-4, the conduits 238 extend generally alongside underneath the handle 26 as the handle 26 is moved. The conduits 238 incur a sag in an area between the reel 78 and the dipper 30. As described above, the reel 78 and the shipper shaft 66 rotate in a proportional manner, such that as the rate of movement of the handle 26 increases, the rotational rate of the reel 78 also increases, and vice versa. This proportional relationship facilitates and maintains an ideal amount sag (i.e., a preset tension) in the conduits 238, regardless of the position of the dipper 30, such that the conduits 238 do not impede or interfere with operation of the mining shovel 10.

The conduits 226, 230, 234, 238 provide pathways for movement of fluid (e.g., hydraulic fluid, grease, etc.) from one area of the shovel 10 to another. In particular, the hydraulic system 38 supplies pressurized hydraulic fluid to the tilt actuators 34 and dump cylinders through the reel system 74 and to return conduits (e.g., the same conduits 82) back to the fluid source 222 (e.g., a tank) in the base 18, and accommodates various extension conditions of the handle 26 relative to the saddle block 62.

While the illustrated construction uses the shipper shaft 66 to drive rotation of the reel 78, and to facilitate movement of fluid from the fluid source 222 to the tilt actuators 34, in some constructions an independent system (e.g., coupled to the boom 22 or elsewhere) drives rotation of the reel 78 instead. The independent system may be, for example, a constant tension/torque motor, controlled stepper motor, or a mechanical tensioning system that provides a generally constant tension on the fourth set of conduits 238, and may be used, for example, to fine-tune and maintain a constant desired sag.

Overall, the reel system 74 allows routing of hydraulic fluid from the base 18 to various components of the shovel 10, and in particular the tilt actuators 34, so that hydraulic fluid is delivered during both translational motion and rotational motion of the handle 26, and so that a tilting dipper 30 can be used on the shovel 10. The reel system 74 advantageously is disposed within the boom 22 to provide space savings and inhibit damage to the reel 78 during use. The reel system 74 is accessible, with the reel 78 configured to pivot away from the boom so that repairs and/or replacement of reel system 74 components can advantageously take place with ease.

Although the invention has been described in detail with reference to certain preferred embodiments, variations and modifications exist within the scope and spirit of one or more independent aspects of the invention as described.

The invention claimed is:

1. A mining machine comprising:
 a boom having an interior chamber;
 a handle slidably coupled to the boom; and
 a reel system disposed at least partially within the chamber;
 wherein the reel system includes a reel and at least one flexible conduit coupled to the reel;
 wherein the mining machine includes a dipper coupled to the handle, wherein the at least one flexible conduit extends from the reel system to at least one of the dipper, the handle, or a tilt actuator; and
 wherein the mining machine includes a base, and a first manifold disposed inside the boom, and wherein at least one rigid conduit extends from the base to the first manifold.

2. The mining machine of claim 1, wherein the reel is movable from a first position inside the chamber to a second position at least partially outside of the chamber.

3. The mining machine of claim 1, wherein the reel system includes a first drive member coupled to the reel to drive rotation of the reel.

4. The mining machine of claim 3, wherein the reel system includes a second drive member coupled to the first drive member to drive rotation of the first drive member.

5. The mining machine of claim 4, wherein the first drive member has a first diameter, and the second drive member has a second diameter different than the first diameter.

6. The mining machine of claim 4, wherein the first and second drive members are coupled together with a continuous loop element.

7. The mining machine of claim 4, wherein the mining machine includes a shipper shaft, and the second drive member is coupled to and rotates with the shipper shaft.

8. The mining machine of claim 7, wherein the first and second drive members are coupled together with a continuous loop element, wherein the first drive member has a first diameter, and the second drive member has a second diameter different than the first diameter, and wherein a ratio of the second diameter to the first diameter is greater than 1:1.

9. The mining machine of claim 1, further comprising a first access element coupled to the boom that provides visible access to the chamber and the reel system.

10. The mining machine of claim 8, wherein the first access element is coupled to a bottom facing surface of the boom, and has an opening extending through the first access element that provides the visual access to the chamber and the reel system.

11. The mining machine of claim 9, wherein the first access element is coupled to the reel system.

12. The mining machine of claim 9, wherein the first access element is pivotably coupled to the boom.

13. The mining machine of claim 9, further comprising a second access element coupled to a side facing surface of the boom.

14. The mining machine of claim 13, wherein the reel system includes a drive shaft that extends through the second access element.

15. The mining machine of claim 14, wherein the reel system includes a drive member releasably coupled to the drive shaft, the drive member disposed outside of the chamber.

16. The mining machine of claim 1, wherein the at least one flexible conduit is at least one first flexible conduit, wherein the reel system includes a swivel rotary union, and wherein at least one second, flexible conduit extends from the first manifold to the swivel rotary union.

17. The mining machine of claim 15, wherein the reel system includes a second manifold, and wherein at least one third, flexible conduit extends from the swivel rotary union to the second manifold.

18. The mining machine of claim 16, wherein the at least one first flexible conduit extends from the second manifold to at least one of the dipper, the handle, or the tilt actuator.

19. The mining machine of claim 1, wherein the chamber is exposed through an opening along a bottom of the boom, and wherein a portion of the at least one flexible conduit extends out of the opening and beneath the handle.

20. A mining machine comprising:
 a base;
 a boom coupled to the base and having an interior chamber;
 a shipper shaft coupled to the boom;
 a handle coupled to the shipper shaft and driven linearly by the shipper shaft;
 a dipper coupled to the handle; and
 a reel system pivotally disposed at least partially within the chamber, the reel system including:
  a reel;
  a first drive member coupled to the reel to drive rotation of the reel;
  a second drive member coupled to the shipper shaft to drive rotation of the first drive member; and
  at least one first conduit extending from the base to the reel, and at least one second conduit extending from the reel to at least one of the dipper, the handle, or a tilt actuator.

21. The mining machine of claim 20, wherein the reel is movable from a first position inside the chamber to a second position at least partially outside of the chamber.

22. The mining machine of claim 20, wherein the first drive member has a first diameter, and the second drive member has a second diameter different than the first diameter.

23. The mining machine of claim 20, wherein the first and second drive members are coupled together with a continuous loop element.

24. The mining machine of claim 20, further comprising a first access element coupled to the boom that provides visible access to the chamber and the reel system.

25. The mining machine of claim 24, wherein the first access element is coupled to a bottom facing surface of the boom, and has an opening extending through the first access element that provides the visual access to the chamber and the reel system.

26. The mining machine of claim 24, wherein the first access element is coupled to the reel system.

27. The mining machine of claim 24, wherein the first access element is pivotably coupled to the boom.

28. The mining machine of claim 24, further comprising a second access element coupled to a side facing surface of the boom.

29. The mining machine of claim 28, wherein the reel system includes a drive shaft that extends through the second access element.

30. The mining machine of claim 20, wherein the reel system includes a first manifold disposed inside the boom, and wherein the at least one first conduit extends from the base to the first manifold.

31. The mining machine of claim 30, wherein the reel system includes a swivel rotary union, wherein at least one third conduit extends from the first manifold to the swivel rotary union.

32. The mining machine of claim 31, wherein the reel system includes a second manifold, wherein at least one fourth conduit extends from the swivel rotary union to the second manifold.

33. The mining machine of claim 32, wherein the at least one second conduit extends from the second manifold toward the handle and the dipper.

34. The mining machine of claim 20, wherein the chamber is exposed through an opening along a bottom of the boom, and wherein a portion of the at least one second conduit extends out of the opening and beneath the handle.

35. The mining machine of claim 20, wherein the first and second drive members are coupled together with a continuous loop element, wherein the first drive member has a first diameter, and the second drive member has a second diameter different than the first diameter, and wherein a ratio of the second diameter to the first diameter is greater than 1:1.

36. A mining machine comprising:
a boom having an interior chamber;
a handle slidably coupled to the boom; and
a reel system disposed at least partially within the chamber,
wherein the reel system includes a reel and at least one flexible conduit coupled to the reel, and
wherein the reel is movable from a first position inside the chamber to a second position at least partially outside of the chamber.

37. A mining machine comprising:
a boom having an interior chamber;
a handle slidably coupled to the boom;
a reel system disposed at least partially within the chamber; and
a first access element coupled to the boom that provides visible access to the chamber and the reel system;
wherein the first access element is coupled to a bottom facing surface of the boom, and has an opening extending through the first access element that provides the visual access to the chamber and the reel system.

38. A mining machine comprising:
a boom having an interior chamber;
a handle slidably coupled to the boom;
a reel system disposed at least partially within the chamber; and
a first access element coupled to the boom that provides visible access to the chamber and the reel system;
wherein the first access element is pivotably coupled to the boom.

* * * * *